(12) United States Patent
Murata et al.

(10) Patent No.: US 11,465,690 B2
(45) Date of Patent: Oct. 11, 2022

(54) VEHICLE BODY STRUCTURE

(71) Applicant: Toyota Jidosha Kabushiki Kaisha, Toyota (JP)

(72) Inventors: Soshiro Murata, Nagoya (JP); Takashi Sagisaka, Miyoshi (JP); Ayaka Kagami, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 417 days.

(21) Appl. No.: 16/703,203

(22) Filed: Dec. 4, 2019

(65) Prior Publication Data

US 2020/0180705 A1 Jun. 11, 2020

(30) Foreign Application Priority Data

Dec. 7, 2018 (JP) .............................. JP2018-230228

(51) Int. Cl.
*B62D 25/20* (2006.01)
*B62D 21/15* (2006.01)
*B62D 27/02* (2006.01)

(52) U.S. Cl.
CPC ....... *B62D 25/2027* (2013.01); *B62D 21/152* (2013.01); *B62D 27/023* (2013.01)

(58) Field of Classification Search
CPC ... B62D 25/02; B62D 25/2027; B62D 25/202
See application file for complete search history.

(56) References Cited

U.S. PATENT DOCUMENTS

| 7,520,563 B1 * | 4/2009 | An | B62D 25/2036 |
| | | | 296/203.03 |
| 2017/0113730 A1 * | 4/2017 | Sakurada | B62D 25/025 |

FOREIGN PATENT DOCUMENTS

| DE | 102011077810 A1 | | 12/2012 | |
| JP | 2001-347966 A | | 12/2001 | |
| JP | 2013112210 A | * | 6/2013 | |
| JP | 2015-209024 A | | 11/2015 | |
| WO | WO-2016136339 A1 | * | 9/2016 | ........... B62D 21/157 |
| WO | WO-2017046217 A2 | * | 3/2017 | ........... B62D 25/025 |

* cited by examiner

*Primary Examiner* — James A English
*Assistant Examiner* — Matthew James O'Neill
(74) *Attorney, Agent, or Firm* — Dinsmore & Shohl LLP

(57) ABSTRACT

A vehicle body structure that includes a rear floor side member that extends along a vehicle front-rear direction at a vehicle width direction end portion of a vehicle rear section and that is divided into front and rear portions in the vehicle front-rear direction. The rear floor side member includes a joint section that is provided between a vehicle width direction inner side of a rocker rear, which is provided along the vehicle front-rear direction at a vehicle front-rear direction rear side of a rocker extending along the vehicle front-rear direction at a vehicle side section, and a vehicle front-rear direction front end of an attachment portion of a rear suspension member in vehicle side view, and that joins together a rear floor side member front portion and a rear floor side member rear portion.

5 Claims, 5 Drawing Sheets

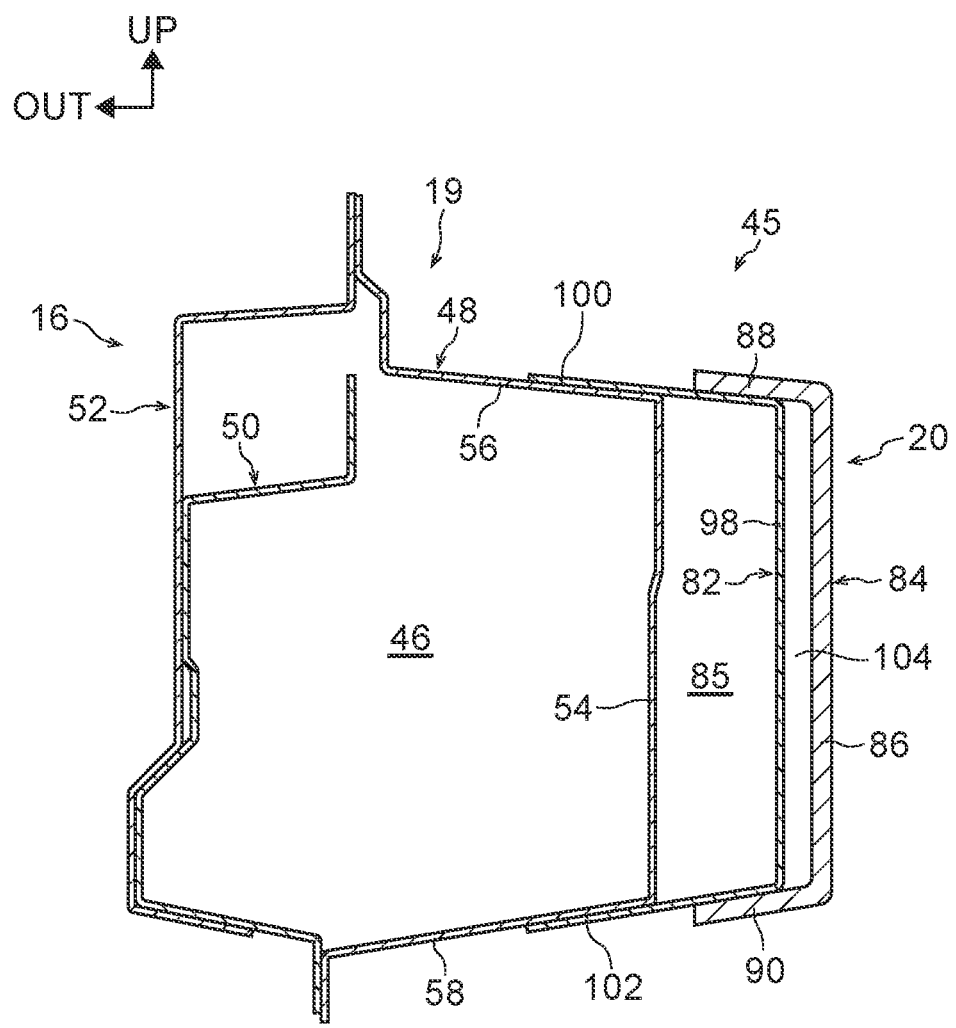

VEHICLE BODY STRUCTURE

CROSS-REFERENCE TO RELATED APPLICATION

This application is based on and claims priority under 35 USC 119 from Japanese Patent Application No. 2018-230228 filed on Dec. 7, 2018, the disclosure of which is incorporated by reference herein.

BACKGROUND

Technical Field

The present disclosure relates to a vehicle body structure.

Related Art

Japanese Patent Application Laid-Open (JP-A) No. 2001-347966 discloses technology in which a front side member extending along a vehicle front-rear direction and disposed at a vehicle width direction end portion is formed using a cast material such as an aluminum alloy, and a rear side member extending along the vehicle front-rear direction at the vehicle front-rear direction rear side of the front side member is formed using an extrusion-molded material such as an aluminum alloy, and these members are coupled together.

In the above technology, since the front side member and the rear side member are formed using aluminum alloys or the like as described above, although rigidity can be set higher than that of a ferrous member, brittleness is also higher than that of a ferrous member. Thus, in a side-on collision of a vehicle (hereafter referred to as "vehicle side-on collision"), and in particular, in a side-on collision such as a side-on collision with a pole in which collision load is concentrated at a side section of the vehicle, if a side member (hereafter referred to as "rear floor side member") configured by a front side member and a rear side member were to fail, surrounding vehicle components (such as a fuel tank) might be affected by fragments from the side member.

SUMMARY

An aspect of the disclosure is a vehicle body structure that includes a rear floor side member that extends along a vehicle front-rear direction at a vehicle width direction end portion of a vehicle rear section and that is divided into front and rear portions in the vehicle front-rear direction, the rear floor side member that includes: a rear floor side member front portion that is made of a ferrous metal and that configures a front portion of the rear floor side member; a rear floor side member rear portion that is die-cast and that configures a rear portion of the rear floor side member; and a joint section that is provided between a vehicle width direction inner side of a rocker rear, which is provided along the vehicle front-rear direction at the vehicle front-rear direction rear side of a rocker extending along the vehicle front-rear direction at a vehicle side section, and a vehicle front-rear direction front end of an attachment portion of a rear suspension member in vehicle side view, and that joins together the rear floor side member front portion and the rear floor side member rear portion.

BRIEF DESCRIPTION OF THE DRAWINGS

FIG. 5 is a cross-section corresponding to FIG. 2, illustrating a modified example 1 of a rear floor side member configuring a vehicle body structure according to an exemplary embodiment of the present disclosure.

DETAILED DESCRIPTION

Explanation follows regarding a vehicle body (vehicle) applied with a vehicle body structure according to an exemplary embodiment of the present disclosure. Note that in the respective drawings, the arrow FR indicates a vehicle front-rear direction front side, and the arrow UP indicates a vehicle vertical direction upper side, as appropriate. The arrow OUT indicates a vehicle width direction outer side. Unless specifically stated otherwise, in the below explanation, simple reference to front and rear, left and right, and up and down directions refers to front and rear in the vehicle front-rear direction, left and right in the vehicle left-right direction (vehicle width direction), and up and down in the vehicle vertical direction.

Configuration of Vehicle Body Structure

First, explanation is given regarding configuration of the vehicle body structure according to the present exemplary embodiment.

Figure 1:
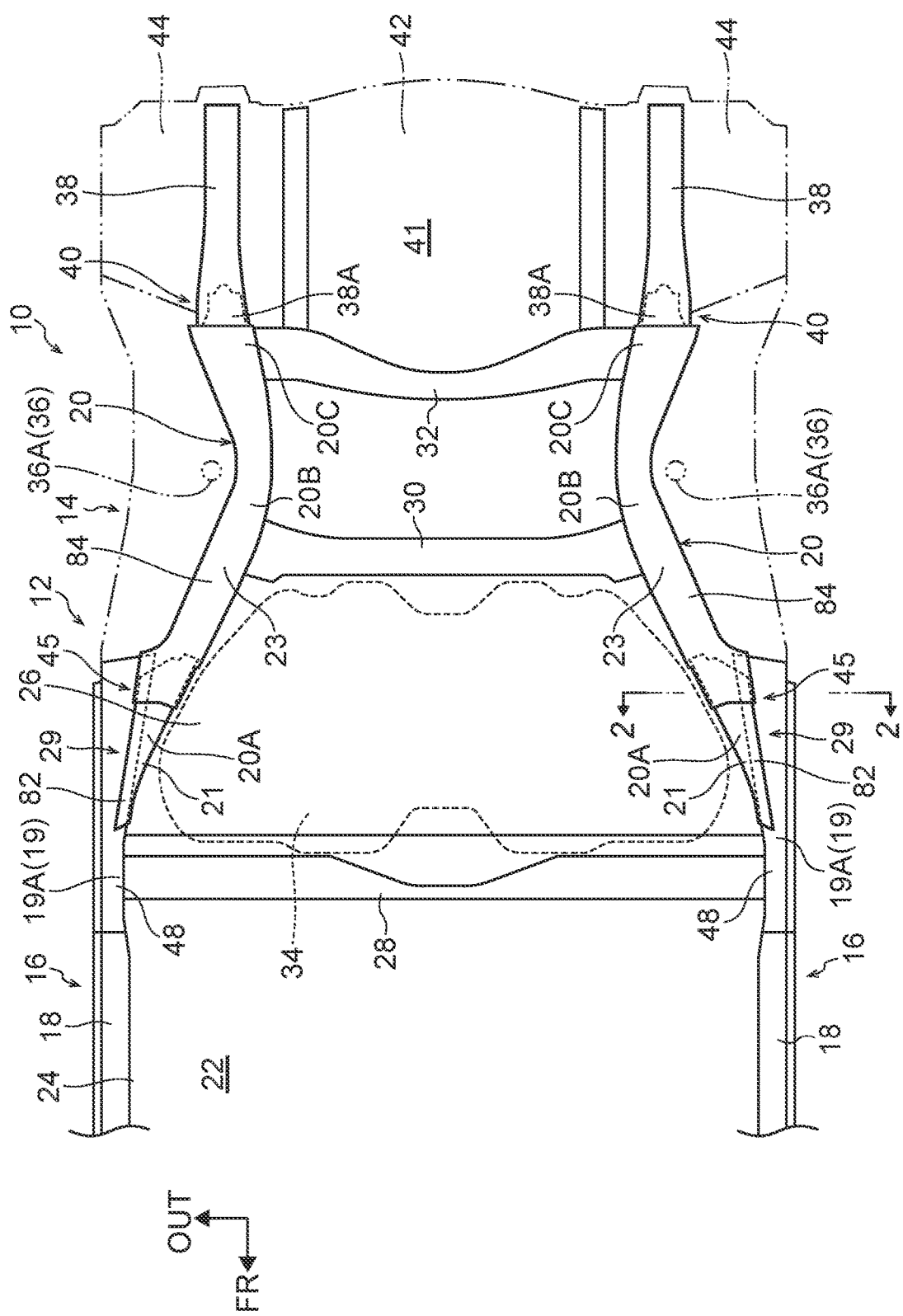
FIG. 1 is a plan view illustrating a rear section of a vehicle lower section applied with a vehicle body structure according to an exemplary embodiment of the present disclosure.

FIG. 1 is a plan view illustrating a rear section (hereafter referred to as "vehicle rear section") 14 side of a vehicle 10 at a lower section (hereafter referred to as "vehicle lower section") 12 of the vehicle 10, which is applied with the vehicle body structure according to the present exemplary embodiment.

As illustrated in FIG. 1, left and right rockers 18 are provided extending along the vehicle front-rear direction at side sections (hereafter referred to as "vehicle side sections") 16 of the vehicle 10. A cross-section profile of each of the rockers 18 when sectioned along directions (the vehicle vertical direction and the vehicle width direction) that are orthogonal to the length direction of the rocker 18 is a closed cross-section profile, and the left and right rockers 18 respectively configure parts of framework of the vehicle side sections 16.

A floor panel 24, configuring a floor surface of a vehicle cabin interior (cabin) 22, is provided extending along the vehicle front-rear direction and the vehicle width direction between the left and right rockers 18. The two vehicle width direction end portions of the floor panel 24 are respectively joined to the left and right rockers 18. A rocker rear 19 extends along the vehicle front-rear direction at the vehicle front-rear direction rear side of each of the left and right rockers 18, and each of the rockers 18 is joined together with the corresponding rocker rear 19 to form a single unit. Note that each of the rockers 18 may be formed integrally with the corresponding rocker rear 19.

A floor cross member 28 is installed extending along the vehicle width direction between vehicle front-rear direction front end portions 19A of the left and right rocker rears 19. The floor cross member 28 is joined to the vehicle front-rear direction front end portions 19A above the floor panel 24. Vehicle front-rear direction front end portions 20A of rear floor side members 20 that extend along the vehicle front-rear direction are joined to the vehicle width direction inner sides of the respective left and right rocker rears 19.

A central floor panel 26, configuring the floor surface at a rear section side of the vehicle cabin interior 22, is provided between the left and right rear floor side members 20. The central floor panel 26 extends along the vehicle front-rear direction and the vehicle width direction, and is positioned at the vehicle front-rear direction rear side of the floor panel 24. The left and right rear floor side members 20 are respectively joined to the two vehicle width direction end portions of the central floor panel 26.

A floor cross member 30 is installed extending along the vehicle width direction between the left and right rear floor side members 20 at vehicle front-rear direction center portions 20B of the left and right rear floor side members 20. The floor cross member 30 is joined to the vehicle front-rear direction center portions 20B of the rear floor side members 20 above the central floor panel 26.

A floor cross member 32 is installed extending along the vehicle width direction between the left and right rear floor side members 20 at vehicle front-rear direction rear end portions 20C of the rear floor side members 20. Similarly to the floor cross member 30 described above, the floor cross member 32 is joined to the vehicle front-rear direction rear end portions 20C above the central floor panel 26.

Note that a fuel tank 34 is installed at the lower side of the central floor panel 26 between vehicle front-rear direction front portion sides of the left and right rear floor side members 20, namely, between the floor cross member 28 and the floor cross member 30. Moreover, suspension towers (attachment portions for rear suspension members) 36, to which shock absorbers or the like are attached, are respectively provided at the vehicle width direction outer sides of the left and right rear floor side members 20.

Rear floor side member rears 38 respectively extend along the vehicle front-rear direction at the vehicle front-rear direction rear side of the left and right rear floor side members 20. A rear floor panel 42, configuring a floor surface of a luggage compartment interior 41, is provided extending along the vehicle front-rear direction and the vehicle width direction at the vehicle front-rear direction rear side of the central floor panel 26.

Rear floor side panels 44 are respectively provided extending along the vehicle front-rear direction and the vehicle width direction at the two vehicle width direction outer sides of the rear floor panel 42. The left and right rear floor side member rears 38 are respectively joined to the rear floor side panels 44.

Figure 2:
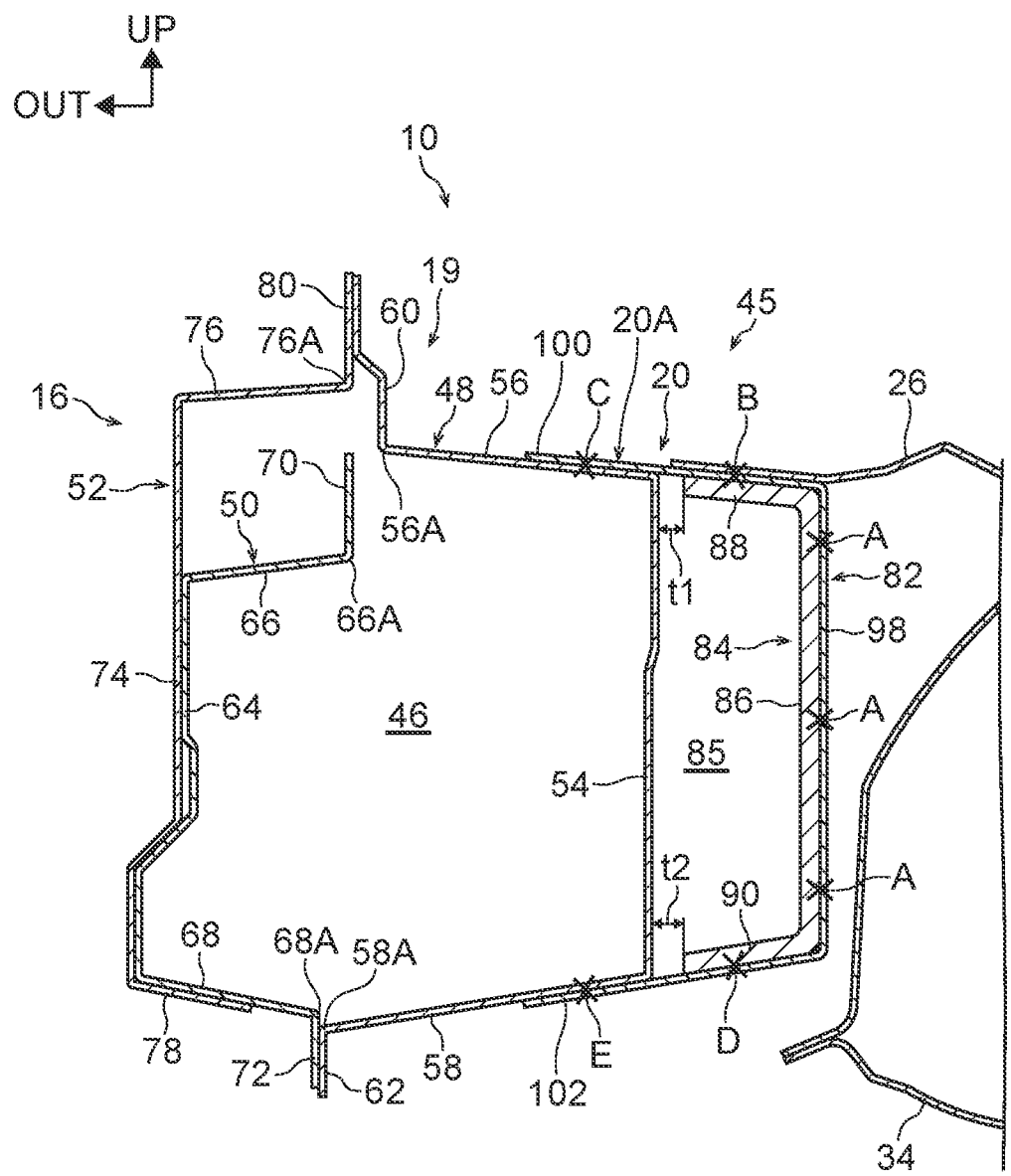
FIG. 2 is a cross-section illustrating a joint section between a rocker rear and a rear floor side member at a position sectioned along line 2-2 in FIG. 1.

FIG. 2 illustrates a cross-section profile of a joint section 45 between one of the rocker rears 19 and the corresponding rear floor side member 20 at a position sectioned along line 2-2 in FIG. 1.

As illustrated in FIG. 2, in the present exemplary embodiment, a cross-section profile of the rocker rear 19 when sectioned along the vehicle vertical direction and the vehicle width direction is formed with a closed cross-section area 46 (described later). The rocker rear 19 is configured including a plate shaped rocker rear inner 48 configuring the vehicle width direction inner side of the rocker rear 19, and a plate shaped rocker rear outer 50 configuring the vehicle width direction outer side of the rocker rear 19.

The rocker rear inner 48 and the rocker rear outer 50 are joined together by welding or the like to form a single unit, and the vehicle front-rear direction front end portion 20A of the corresponding rear floor side member 20 is joined to the rocker rear inner 48. Note that the rocker rear 19 does not necessarily have to be configured including the rocker rear inner 48 and the rocker rear outer 50, and may be formed such that the rocker rear inner 48 and the rocker rear outer 50 are integrated together.

A side member outer 52, configuring a styling face of the corresponding vehicle side section 16, is provided at the vehicle width direction outer side of the rocker rear 19. Although the closed cross-section area 46 is formed between the side member outer 52 and the rocker rear inner 48 in FIG. 2, at other vehicle front-rear direction positions, the closed cross-section area 46 is formed between the rocker rear inner 48 and the rocker rear outer 50.

Rocker Rear Inner

Explanation follows regarding the rocker rear inner 48.

As illustrated in FIG. 2, a cross-section profile of the rocker rear inner 48 when sectioned along the vehicle vertical direction and the vehicle width direction is a substantially hat shaped profile open toward the vehicle width direction outer side. An upright wall (first upright wall) 54, formed running along the vehicle front-rear direction and the vehicle vertical direction, is provided at a vehicle vertical direction center portion of the rocker rear inner 48.

An upper wall (first upper wall) 56 that is linked to the upright wall 54 is provided extending along the vehicle front-rear direction and the vehicle width direction at the vehicle vertical direction upper side of the upright wall 54. A lower wall (first lower wall) 58 that is linked to the upright wall 54 is provided extending along the vehicle front-rear direction and the vehicle width direction at the vehicle vertical direction lower side of the upright wall 54 so as to oppose the upper wall 56.

An upper flange 60 extends toward the vehicle vertical direction upper side from a vehicle width direction outer end 56A of the upper wall 56, and a lower flange 62 extends toward the vehicle vertical direction lower side from a vehicle width direction outer end 58A of the lower wall 58.

Rocker Rear Outer

Explanation follows regarding the rocker rear outer 50.

A cross-section profile of the rocker rear outer 50 when sectioned along the vehicle vertical direction and the vehicle width direction is a substantially hat shaped profile open toward the vehicle width direction inner side. The rocker rear outer 50 is formed with an upright wall 64 running along the vehicle front-rear direction and the vehicle vertical direction and provided so as to oppose the upright wall 54 of the rocker rear inner 48.

An upper wall 66 that is linked to the upright wall 64 is provided extending along the vehicle front-rear direction and the vehicle width direction at the vehicle vertical direction upper side of the upright wall 64. A lower wall 68 that is linked to the upright wall 64 is provided extending along the vehicle front-rear direction and the vehicle width direction at the vehicle vertical direction lower side of the upright wall 64 so as to oppose the upper wall 66.

An upper flange 70 extends toward the vehicle vertical direction upper side from a vehicle width direction inner end 66A of the upper wall 66, and a lower flange 72 extends toward the vehicle vertical direction lower side from a vehicle width direction inner end 68A of the lower wall 68. Note that lower flange 72 is overlapped and joined together with the lower flange 62 of the rocker rear inner 48.

Side Member Outer

Explanation follows regarding the side member outer 52.

A cross-section profile of the side member outer 52 when sectioned along the vehicle vertical direction and the vehicle width direction is a substantially hat shaped profile open toward the vehicle width direction inner side. An upright wall 74 that overlaps the upright wall 64 of the rocker rear outer 50 is formed running along the vehicle front-rear direction and the vehicle vertical direction.

An upper wall 76 that is linked to the upright wall 74 is formed running along the vehicle front-rear direction and the vehicle width direction at the vehicle vertical direction upper side of the upright wall 74. A lower wall 78 that is linked to the upright wall 74 is formed running along the vehicle front-rear direction and the vehicle width direction at the vehicle vertical direction lower side of the upright wall 74 so as to oppose the upper wall 76. Note that the lower wall 78 is overlapped and joined together with the lower wall 68 of the rocker rear outer 50.

An upper flange 80 extends toward the vehicle vertical direction upper side from a vehicle width direction inner end 76A of the upper wall 76, and the upper flange 80 is overlapped and joined together with the upper flange 60 of the rocker rear inner 48. Note that as described above, the lower wall 78 of the side member outer 52 is overlapped and joined together with the lower wall 68 of the rocker rear outer 50, and so there is no lower flange formed thereto.

Rear Floor Side Member

Explanation follows regarding the rear floor side member 20.

As illustrated in FIG. 1, each of the rear floor side members 20 is curved so as to project toward the vehicle width direction inner side in plan view, and curved so as to project toward the vehicle vertical direction upper side in side view. The vehicle front-rear direction front end portion 20A of each of the rear floor side members 20 is joined to the rocker rear inner 48 configuring the vehicle width direction inner side of the corresponding rocker rear 19 (at a joint section 29), and the vehicle front-rear direction rear end portion 20C of each of the rear floor side members 20 is joined to a vehicle front-rear direction front end portion 38A of the corresponding rear floor side member rear 38 (at a joint section 40).

Figure 3:
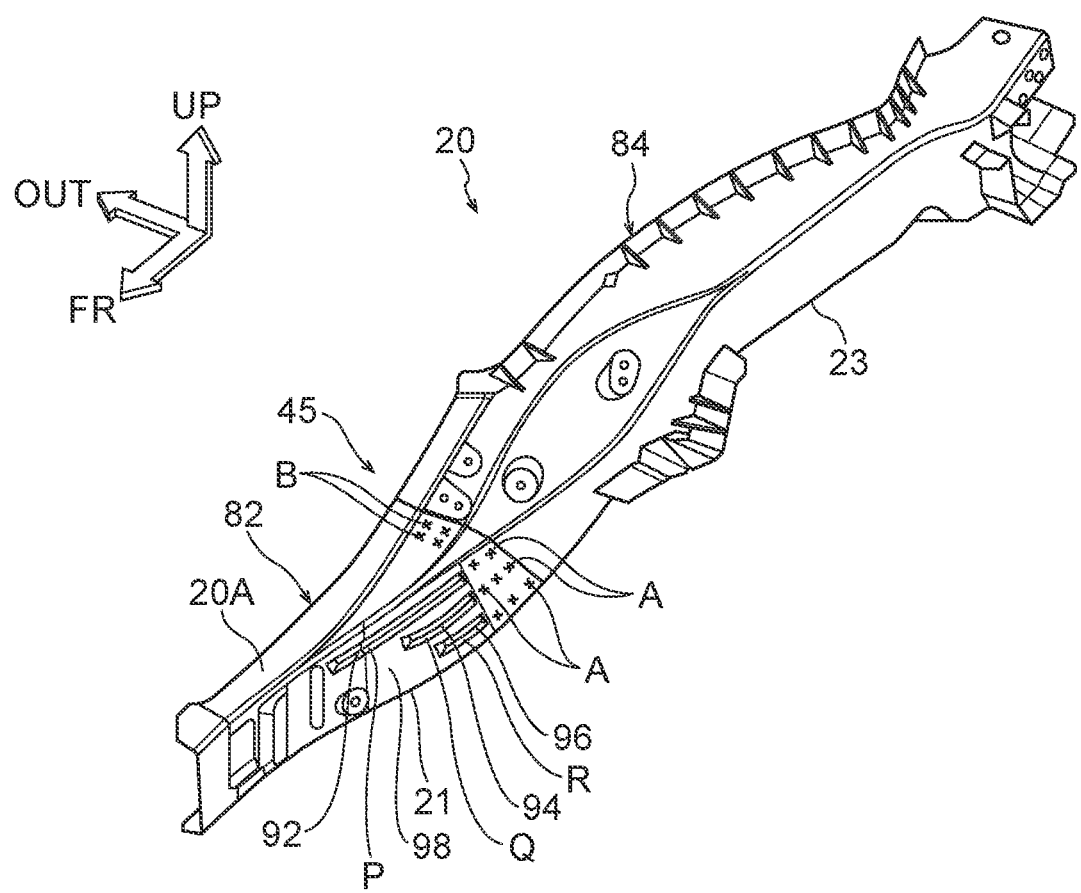
FIG. 3 is a perspective view illustrating a rear floor side member configuring a vehicle body structure according to an exemplary embodiment of the present disclosure, in a state viewed from a vehicle front-rear direction front side and a vehicle width direction inner side.
Figure 4:
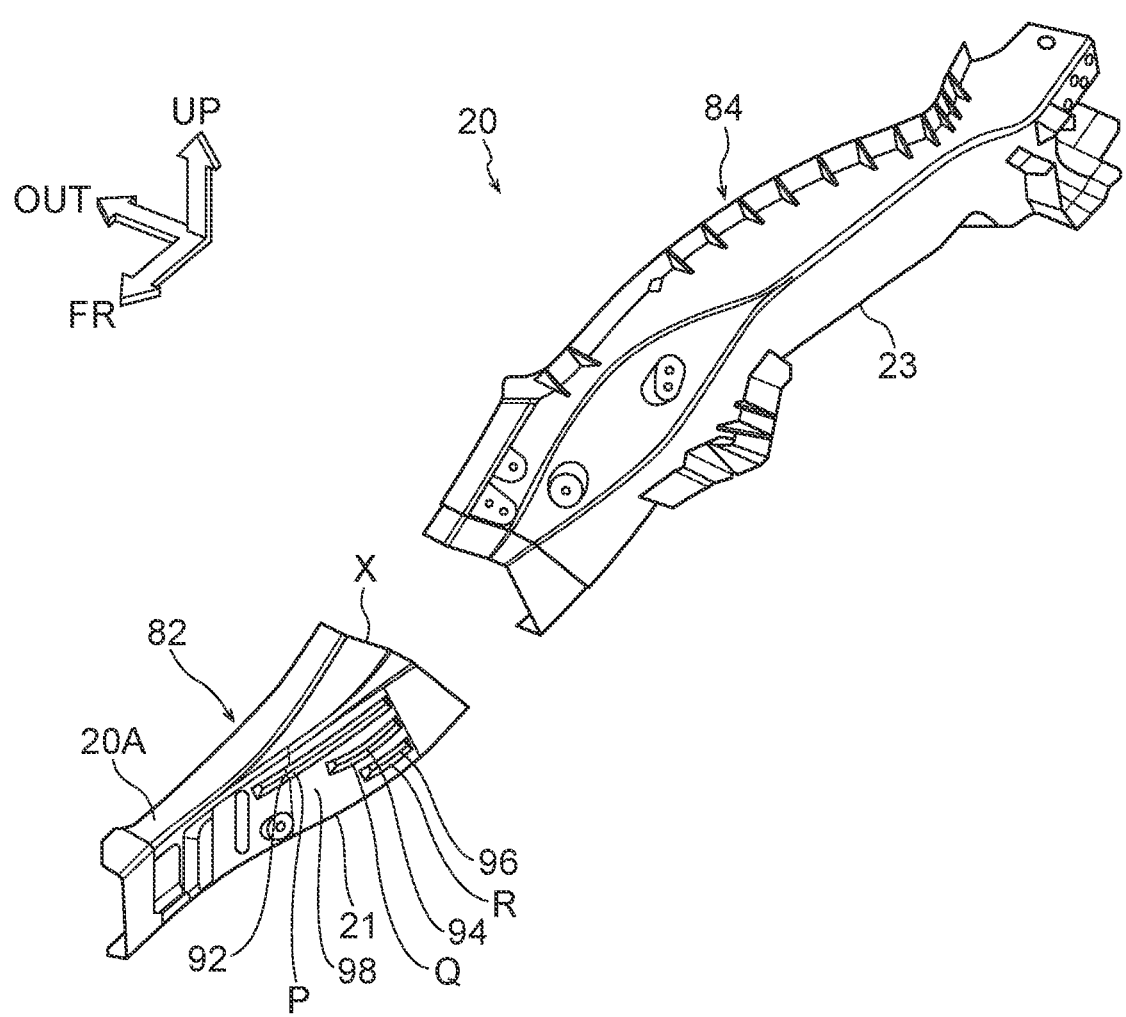
FIG. 4 is an exploded perspective view illustrating a rear floor side member configuring a vehicle body structure according to an exemplary embodiment of the present disclosure, in a state divided into front and rear in the vehicle front-rear direction.

FIG. 3 is a perspective view illustrating one of the rear floor side members 20 viewed from the vehicle front-rear direction front side and the vehicle width direction inner side, and FIG. 4 is an exploded perspective view illustrating a state in which the rear floor side member 20 has been divided into front and rear in the vehicle front-rear direction.

As illustrated in FIG. 3 and FIG. 4, in the present exemplary embodiment, the rear floor side member 20 is divided into front and rear in the vehicle front-rear direction, and the two portions are joined together through the joint section 45. More precisely, the rear floor side member 20 is configured including a rear floor side member front portion 82 configuring a front portion 21 of the rear floor side member 20, and a rear floor side member rear portion 84 configuring a rear portion 23 of the rear floor side member 20.

As illustrated in FIG. 1, the rear floor side member 20 is set such that in vehicle side view the joint section 45 is provided spanning between the vehicle front-rear direction front end portion 20A of the rear floor side member 20 (the vehicle width direction inner side of the corresponding rocker rear 19) and a vehicle front-rear direction front end 36A of the corresponding suspension tower 36.

Namely, in the present exemplary embodiment, the rear floor side member 20 is divided into the rear floor side member front portion 82 and the rear floor side member rear portion 84, and the rear floor side member front portion 82 and the rear floor side member rear portion 84 are joined together through the joint section 45.

Rear Floor Side Member Rear Portion

Explanation follows regarding the rear floor side member rear portion 84.

The rear floor side member rear portion 84 illustrated in FIG. 3 and FIG. 4 is, for example, formed of die-cast aluminum using a mold that is opened along the vehicle width direction of the rear floor side member 20. Note that the rear floor side member rear portion 84 is not limited to being formed of aluminum, and may be a die-cast article formed of an alloy of zinc, magnesium, copper, or the like, or may be a cast article formed using a sand mold.

As illustrated in FIG. 2, a cross-section profile of the rear floor side member rear portion 84 when sectioned along the vehicle vertical direction and the vehicle width direction has a substantially U shape open toward the vehicle width direction outer side.

The rear floor side member rear portion 84 is formed with an upright wall (second upright wall) 86 running along the vehicle front-rear direction and the vehicle vertical direction at a vehicle vertical direction center portion of the rear floor side member rear portion 84. The upright wall 86 is provided opposing the upright wall 54 of the rocker rear inner 48.

An upper wall (second upper wall) 88 that is linked to the upright wall 86 is provided extending along the vehicle front-rear direction and the vehicle width direction at the vehicle vertical direction upper side of the upright wall 86. The upper wall 88 is disposed in a state in which a gap t1 is provided between the upper wall 88 and the upright wall 54 of the rocker rear inner 48, and is provided at a position overlapping the upright wall 54 in vehicle side view.

A lower wall (second lower wall) 90 that is linked to the upright wall 86 is provided extending along the vehicle front-rear direction and the vehicle width direction at the vehicle vertical direction lower side of the upright wall 86 so as to oppose the upper wall 88. The lower wall 90 is disposed in a state in which a gap t2 is provided between the lower wall 90 and the upright wall 54 of the rocker rear inner 48, and is provided at a position overlapping the upright wall 54 in vehicle side view. Note that the gap t1 and the gap t2 need not necessarily have the same dimensions.

Rear Floor Side Member Front Portion

Explanation follows regarding the rear floor side member front portion 82.

The rear floor side member front portion 82 illustrated in FIG. 3 and FIG. 4 is made of a ferrous metal. As previously described, in the present exemplary embodiment the rear floor side member front portion 82 and the rear floor side member rear portion 84 are joined together through the joint section 45. The rear floor side member front portion 82 abuts and is joined together with the outer side of the rear floor side member rear portion 84 at the joint section 45.

As illustrated in FIG. 2, a cross-section profile of the rear floor side member front portion 82 when sectioned along the vehicle vertical direction and the vehicle width direction has a substantially U shape open toward the vehicle width direction outer side.

The rear floor side member front portion 82 is formed with an upright wall (third upright wall) 98 running along the vehicle front-rear direction and the vehicle vertical direction at a vehicle vertical direction center portion of the rear floor side member front portion 82. The upright wall 98 is provided opposing the upright wall 54 of the rocker rear inner 48. The upright wall 98 abuts and is joined to the upright wall 86 of the rear floor side member rear portion 84 (at spot joins A).

An upper wall (third upper wall) 100 that is linked to the upright wall 98 is provided extending along the vehicle front-rear direction and the vehicle width direction at the vehicle vertical direction upper side of the upright wall 98. The upper wall 100 abuts and is joined to the upper wall 88 of the rear floor side member rear portion 84 (at spot joins B). The upper wall 100 also abuts and is joined to the upper wall 56 of the rocker rear inner 48 (at spot joins C).

A lower wall (third lower wall) 102 that is linked to the upright wall 98 is provided extending along the vehicle front-rear direction and the vehicle width direction at the vehicle vertical direction lower side of the upright wall 98 so as to oppose the upper wall 100. The lower wall 102 abuts and is joined to the lower wall 90 of the rear floor side member rear portion 84 (at spot joins D). The lower wall 102 also abuts and is joined to the lower wall 58 of the rocker rear inner 48 (at spot joins E). A closed cross-section area 85 is formed between the rear floor side member front portion 82 and the rocker rear inner 48.

Note that the rear floor side member front portion 82 is joined to the rear floor side member rear portion 84 from the vehicle width direction inner side (at the spot joins A, B, D) at the joint section 45, either by joining at one side using flow drill screws (FDS) or the like, or by joining at both sides using self-piercing rivets (SPR) or the like. The rear floor side member front portion 82 is also joined to the rocker rear inner 48 from the vehicle width direction inner side (at the spot joins C, E).

As illustrated in FIG. 3 and FIG. 4, recess shaped bead portions 92, 94, 96 that project toward the vehicle width direction inner side are formed to the rear floor side member front portion 82 so as to run along the vehicle front-rear direction in side view. The bead portions 92, 94, 96 are disposed in a row along the vehicle vertical direction.

The spot joins A between the upright wall 98 of the rear floor side member front portion 82 and the upright wall 86 of the rear floor side member rear portion 84 are provided on extension lines of the bead portions 92, 94, 96. Note that although the recess shaped bead portions 92, 94, 96 are formed projecting toward the vehicle width direction inner side in the present exemplary embodiment, protruding shaped bead portions may be formed projecting toward the vehicle width direction outer side.

Operation and Effects of Vehicle Body Structure

Explanation follows regarding operation and effects of the vehicle body structure according to the present exemplary embodiment.

In the present exemplary embodiment, the rear floor side members 20, which extend along the vehicle front-rear direction at vehicle width direction end portions of the vehicle rear section 14 illustrated in FIG. 1, are each divided into front and rear in the vehicle front-rear direction. More precisely, each of the rear floor side members 20 is configured including the ferrous rear floor side member front portion 82 configuring the front portion 21 of the rear floor side member 20, and the die-cast rear floor side member rear portion 84 configuring the rear portion 23 of the rear floor side member 20.

The rear floor side member 20 is also provided with the joint section 45 that joins the rear floor side member front portion 82 and the rear floor side member rear portion 84 together and spans in vehicle side view between the vehicle front-rear direction front end portion 20A of the rear floor side member 20 and the vehicle front-rear direction front end 36A of the corresponding suspension tower 36.

Although members formed by die-casting generally allow a high degree of freedom for design, such that high rigidity may be obtained by locally increasing the thickness or providing reinforcing ribs, die-cast members are also more brittle than ferrous members.

As illustrated in FIG. 1, a battery, the fuel tank 34 and so on are installed at the vehicle width direction inner side of the rocker rears 19, and so there is a need to suppress failure of the rear floor side members 20 located at the vehicle width direction inner sides of the rocker rears 19. Thus ductility, as well as rigidity, is demanded of the rear floor side members 20. Meanwhile, steering stability of the vehicle 10 is demanded of the suspension towers 36. High rigidity is therefore demanded of the rear floor side members 20.

Thus, in each of the rear floor side members 20 in the present exemplary embodiment, the rear floor side member front portion 82 disposed on the rocker rear 19 side is formed of ferrous metal, and the rear floor side member rear portion 84 disposed on the suspension tower 36 side is formed by die-casting.

Thus, in the present exemplary embodiment, the rigidity and ductility that are necessary in a side-on collision of the vehicle 10 are obtained on the rear floor side member front portion 82 side, and the rigidity that is necessary while the vehicle 10 is traveling is obtained on the rear floor side member rear portion 84 side. Moreover, since the rigidity and ductility that are necessary in a side-on collision of the vehicle 10 are obtained on the rear floor side member front portion 82 side as described above, failure of the rear floor side member 20 can be suppressed, even if the vehicle 10 is involved in a side-on collision such as a side-on collision with a pole.

As illustrated in FIG. 2, in the present exemplary embodiment, the upright wall 86 of the rear floor side member rear portion 84 is provided opposing the upright wall 54 of the rocker rear inner 48. The upper wall 88 and lower wall 90 of the rear floor side member rear portion 84 are disposed in a state in which the gaps t1, t2 are respectively provided between the upper wall 88 and lower wall 90 and the upright wall 54 of the rocker rear inner 48, and are provided at positions overlapping the upright wall 54 in vehicle side view.

In the present exemplary embodiment, the closed cross-section area 85 is formed between the rear floor side member front portion 82 and the rocker rear inner 48, and the upright wall 98 of the rear floor side member front portion 82 is joined to the upright wall 86 of the rear floor side member rear portion 84 (at the spot joins A). The upper wall 100 of the rear floor side member front portion 82 is joined to the upper wall 88 of the rear floor side member rear portion 84 (at the spot joins B), and is also joined to the upper wall 56 of the rocker rear inner 48 (at the spot joins C). The lower wall 102 of the rear floor side member front portion 82 is joined to the lower wall 90 of the rear floor side member rear portion 84 (at the spot joins D), and is also joined to the lower wall 58 of the rocker rear inner 48 (at the spot joins E).

As described above, in the present exemplary embodiment, the rear floor side member front portion 82 is joined to the rocker rear inner 48, and the closed cross-section area 85 is formed between the rear floor side member front portion 82 and the rocker rear inner 48. This enables the rigidity of the rear floor side member front portion 82 itself to be increased.

In the present exemplary embodiment, the gaps t1, t2 are respectively provided between the upper wall 88 and lower wall 90, configuring parts of the die-cast rear floor side member rear portion 84, and the upright wall 54 of the ferrous rocker rear inner 48. Thus, collision load input to the rocker rear inner 48 in a side-on collision of the vehicle 10 is not directly transmitted toward the rear floor side member rear portion 84 side.

Thus, in the present exemplary embodiment, collision load input to the rocker rear inner 48 in a side-on collision of the vehicle 10 is first transmitted toward the rear floor side member front portion 82. Since the rear floor side member front portion 82 is made of a ferrous metal, the rear floor side member front portion 82 undergoes plastic deformation when input with impact load, enabling impact energy to be absorbed.

The upper wall 88 and lower wall 90 of the rear floor side member rear portion 84 are provided at positions overlapping the upright wall 54 of the rocker rear inner 48 in vehicle side view. This enables collision load to be transmitted from the upright wall 54 of the rocker rear inner 48 to the rear floor side member rear portion 84 through the upper wall 88 and lower wall 90 in a side-on collision of the vehicle 10.

Collision load can also be transmitted from the upper wall 88 and lower wall 90 of the rear floor side member rear portion 84 to the rocker rear inner 48 through the upright wall 54 in a rear collision of the vehicle 10.

Furthermore, in the present exemplary embodiment, the upper wall 100 and lower wall 102 of the rear floor side member front portion 82 are respectively joined to the upper wall 56 and the lower wall 58 of the rocker rear inner 48, thereby increasing the join strength between the rear floor side member front portion 82 and the rocker rear inner 48.

As illustrated in FIG. 3, in the present exemplary embodiment, the shaped bead portions 92, 94, 96 that project so as to have a recess shape in the vehicle width direction are formed to the rear floor side member front portion 82 so as to run along the vehicle front-rear direction. The spot joins A between the rear floor side member front portion 82 and the rear floor side member rear portion 84 are provided on extension lines of the bead portions 92, 94, 96.

Forming the bead portions 92, 94, 96 to the rear floor side member front portion 82 enables the rigidity of the rear floor side member front portion 82 to be increased. Moreover the spot joins A between the rear floor side member front portion 82 and the rear floor side member rear portion 84 have higher rigidity than other locations. Namely, this enables deformation of the rear floor side member front portion 82 to be suppressed.

Respective ridge lines P, Q, R are formed by forming the bead portions 92, 94, 96 to the rear floor side member front portion 82, thereby enabling collision load to be effectively transmitted from the rear floor side member front portion 82 to the rocker rear inner 48 in a rear collision of the vehicle 10.

As illustrated in FIG. 2, in the present exemplary embodiment, the rear floor side member front portion 82 abuts and is joined together with the outer side of the rear floor side member rear portion 84 (at the spot joins A, B, D).

Flow drill screws (FDS), for example, are generally employed when joining a die-cast member to a ferrous member. In such cases, the FDS are inserted into the high rigidity die-cast member from the ferrous member side. Thus, in the present exemplary embodiment, since the ferrous rear floor side member front portion 82 abuts and is joined together with the outer side of the die-cast rear floor side member rear portion 84, heterogeneous members can be joined using FDS, rivets, or the like.

When joining using rivets, the joined members press-contact each other in their thickness directions similarly to in spot welding, thus rendering joining equipment such as a brazing torch unnecessary. Thus, in the present exemplary embodiment, the rear floor side member front portion 82 that is a ferrous member and the rear floor side member rear portion 84 that is a die-cast member are joined together by joining using rivets.

Namely, although the rear floor side member front portion 82 and the rear floor side member rear portion 84 are heterogeneous members, during assembly of the vehicle 10 illustrated in FIG. 1, in a rear-under assembly process in which the vehicle rear section 14 side of the vehicle lower section 12 is assembled, joining together of the rear floor side member front portion 82 and the rear floor side member rear portion 84 is completed by joining using rivets. This enables body structures made using ferrous members and body structures made using die-cast members to be jointly manufactured.

Modified Examples of Present Exemplary Embodiment

As illustrated in FIG. 2, in the present exemplary embodiment, the rear floor side member front portion 82 abuts and is joined to the outer side of the rear floor side member rear portion 84 at the joint section 45 between the rear floor side member front portion 82 and the rear floor side member rear portion 84. However, there is no limitation thereto.

For example, as illustrated in FIG. 5, the rear floor side member rear portion 84 may abut and be joined to the outer side of the rear floor side member front portion 82 at the joint section 45 between the rear floor side member front portion 82 and the rear floor side member rear portion 84.

Moreover, as illustrated in FIG. 2, in the present exemplary embodiment, the upright wall 98 of the rear floor side member front portion 82 abuts and is joined to the upright wall 86 of the rear floor side member rear portion 84. However, there is no limitation thereto. As illustrated in FIG. 5, setting may be made such that a closed cross-section area 104 is formed between the rear floor side member front portion 82 and the rear floor side member rear portion 84.

As illustrated in FIG. 4, in the present exemplary embodiment, a dividing plane X of the rear floor side member 20 is formed running along the vehicle vertical direction and the vehicle front-rear direction. However, since it is sufficient that the rear floor side member 20 be divided into front and rear in the vehicle front-rear direction, there is no limitation thereto. For example, a dividing plane may be formed as a plane running along the vehicle front-rear direction and the vehicle width direction.

Note that in such cases, the rear floor side member front portion 82 and the rear floor side member rear portion 84 would be divided in the vertical direction at the joint section 45 between the rear floor side member front portion 82 and the rear floor side member rear portion 84. Since it is sufficient that the rear floor side member 20 can be divided into a front side and a rear side when viewed as a whole, there is no particular limitation to the dividing plane at the joint section 45.

An example of an exemplary embodiment has been given above. However, exemplary embodiments are not limited to the above description, and the exemplary embodiment and various modified examples may be employed in appropriate combinations, and various configurations may be implemented within a range not departing from the spirit of the present disclosure.

An object of the present disclosure is to provide a vehicle body structure capable of suppressing failure of a side member, even in a vehicle side-on collision such as a side-on collision with a pole.

A first aspect of the disclosure is a vehicle body structure that includes a rear floor side member that extends along a vehicle front-rear direction at a vehicle width direction end portion of a vehicle rear section and that is divided into front and rear portions in the vehicle front-rear direction, the rear floor side member that includes: a rear floor side member front portion that is made of a ferrous metal and that configures a front portion of the rear floor side member; a rear floor side member rear portion that is die-cast and that configures a rear portion of the rear floor side member; and a joint section that is provided between a vehicle width direction inner side of a rocker rear, which is provided along the vehicle front-rear direction at the vehicle front-rear direction rear side of a rocker extending along the vehicle front-rear direction at a vehicle side section, and a vehicle front-rear direction front end of an attachment portion of a rear suspension member in vehicle side view, and that joins together the rear floor side member front portion and the rear floor side member rear portion.

In the vehicle body structure of the first aspect, the rear floor side member extends along the vehicle front-rear direction at the vehicle width direction end portion of the vehicle rear section. The rear floor side member is divided into front and rear in the vehicle front-rear direction, and is configured including the rear floor side member front portion that is made of a ferrous metal and that configures the front portion of the rear floor side member, and the rear floor side member rear portion that is made by die-casting and that configures the rear portion of the rear floor side member.

The rocker rear is provided running along the vehicle front-rear direction at the vehicle front-rear direction rear side of the rocker extending along the vehicle front-rear direction at the vehicle side section. The joint section that joins the rear floor side member front portion and the rear floor side member rear portion together is provided to the rear floor side member so as to span in vehicle side view between the vehicle width direction inner side of the rocker rear and the vehicle front-rear direction front end of the attachment portion of the rear suspension member.

Although members formed by die-casting generally allow a high degree of freedom for design, such that high rigidity may be obtained by locally increasing the thickness or providing reinforcing ribs, die-cast members are also more brittle than ferrous members.

A battery, a fuel tank, and so on are installed at the vehicle width direction inner side of the rocker rear, and so there is a need to suppress failure of the rear floor side member at the vehicle width direction inner side of the rocker rear. Thus, ductility, as well as rigidity, is demanded of the rear floor side member. Meanwhile, vehicle steering stability is demanded of the attachment portion of the rear suspension member. High rigidity is therefore required of the rear floor side member.

Thus, in the rear floor side member in the present disclosure, the rear floor side member front portion disposed on the rocker rear side is formed of ferrous metal, and the rear floor side member rear portion disposed on the side of the attachment portion of the rear suspension member is formed by die-casting. Thus, in the present disclosure, the rigidity and ductility that are necessary in a vehicle side-on collision are obtained on the rear floor side member front portion side, and the rigidity that is necessary while the vehicle is traveling is obtained on the rear floor side member rear portion side. Note that in the present disclosure, "ferrous metals" include sheet steel.

A second aspect of the disclosure is the first aspect of the vehicle body structure, wherein the rear floor side member front portion abuts and is joined together with an outer side of the rear floor side member rear portion.

Flow drill screws (FDS), for example, are generally employed when joining a die-cast member to a ferrous member. In such cases, the FDS are inserted into the high rigidity die-cast member from the ferrous member side. Thus, in the vehicle body structure of the second aspect, since the ferrous rear floor side member front portion abuts and is joined together with the outer side of the die-cast rear floor side member rear portion, heterogeneous members can be joined using FDS, rivets, or the like.

A third aspect of the disclosure is the second aspect of the vehicle body structure, wherein: a cross-section profile of a rocker rear inner configuring a vehicle width direction inner side of the rocker rear, when sectioned along a vehicle vertical direction and the vehicle width direction, is an open cross-section profile that opens toward a vehicle width direction outer side; the rocker rear inner includes: a first upright wall that is provided at a vehicle vertical direction center portion of the rocker rear inner and that extends along the vehicle vertical direction and the vehicle front-rear direction, a first upper wall that is provided at a vehicle vertical direction upper side of the first upright wall, and that is linked to the first upright wall by extending along the vehicle front-rear direction and the vehicle width direction, and a first lower wall that is provided at a vehicle vertical direction lower side of the first upright wall so as to oppose the first upper wall, and that is linked to the first upright wall by extending along the vehicle front-rear direction and the vehicle width direction; and the rear floor side member rear portion includes: a second upright wall that is provided at a vehicle vertical direction center portion of the rear floor side member rear portion so as to oppose the first upright wall and that extends along the vehicle vertical direction and the vehicle front-rear direction, a second upper wall that is provided at a vehicle vertical direction upper side of the second upright wall, that is linked to the second upright wall by extending along the vehicle front-rear direction and the vehicle width direction, that is disposed in a state in which a gap is provided between the second upper wall and the first upright wall, and that is provided at a position that overlaps with the first upright wall in vehicle side view, and a second lower wall that is provided at a vehicle vertical direction lower side of the second upright wall so as to oppose the second upper wall, that is linked to the second upright wall by extending along the vehicle front-rear direction and the vehicle width direction, that is disposed in a state in which a gap is provided between the second lower wall and the first upright wall, and that is provided at a position that overlaps with the first upright wall in vehicle side view.

In the vehicle body structure of the third aspect, the cross-section profile of the rocker rear inner configuring the vehicle width direction inner side of the rocker rear when sectioned along the vehicle vertical direction and the vehicle width direction is an open cross-section profile open toward the vehicle width direction outer side.

The rocker rear inner is configured including the first upright wall, the first upper wall, and the first lower wall. The first upright wall is provided extending along the vehicle vertical direction and the vehicle front-rear direction at the vehicle vertical direction center portion of the rocker rear inner. The first upper wall is provided extending along the vehicle front-rear direction and the vehicle width direction at the vehicle vertical direction upper side of the first upright wall, and is linked to the first upright wall. The first lower wall is provided extending along the vehicle front-rear direction and the vehicle width direction at the vehicle vertical direction lower side of the first upright wall so as to oppose the first upper wall, and is linked to the first upright wall.

The rear floor side member rear portion is configured including the second upright wall, the second upper wall, and the second lower wall. The second upright wall is provided extending along the vehicle vertical direction and the vehicle front-rear direction at the vehicle vertical direction center portion of the rear floor side member rear portion so as to oppose the first upright wall of the rocker rear inner. The second upper wall is provided extending along the vehicle front-rear direction and the vehicle width direction at the vehicle vertical direction upper side of the second upright wall, and is formed linked to the second upright wall. Moreover, the second upper wall is disposed in a state in which a gap is provided between the second upper wall and the first upright wall of the rocker rear inner, and is provided at a position overlapping the first upright wall in vehicle side view. The second lower wall is provided extending along the vehicle front-rear direction and the vehicle width direction at the vehicle vertical direction lower side of the second upright wall so as to oppose the second upper wall, and is formed linked to the second upright wall. The second lower wall is disposed in a state in which a gap is provided between the second lower wall and the first upright wall of the rocker rear inner, and is provided at a position overlapping the first upright wall in vehicle side view.

Thus, in the present disclosure, the gaps are respectively provided between the second upper wall and second lower wall, configuring parts of the die-cast rear floor side member rear portion, and the first upright wall of the rocker rear inner. Thus, collision load input to the rocker rear inner in a vehicle side-on collision is not directly transmitted toward the rear floor side member rear portion side.

Moreover, the second upper wall and second lower wall of the rear floor side member rear portion are provided at positions overlapping the first upright wall of the rocker rear inner in vehicle side view. This enables collision load to be transmitted from the first upright wall of the rocker rear inner to the rear floor side member rear portion through the second upper wall and second lower wall in a vehicle side-on collision. Collision load can also be transmitted from the second upper wall and second lower wall of the rear floor side member rear portion to the rocker rear inner through the first upright wall in a vehicle rear collision.

A fourth aspect of the vehicle body structure is the third aspect of the vehicle body structure, wherein the rear floor side member front portion further includes: a third upright wall that is provided at a vehicle vertical direction center portion of the rear floor side member front portion, that extends along the vehicle vertical direction and the vehicle front-rear direction, and that abuts and is joined to the second upright wall; a third upper wall that is provided at a vehicle vertical direction upper side of the third upright wall, that is linked to the third upright wall by extending along the vehicle front-rear direction and the vehicle width direction, and that abuts and is joined to the first upper wall; and a third lower wall that is provided at a vehicle vertical direction lower side of the third upright wall so as to be able to oppose the third upper wall, that is linked to the third upright wall by extending along the vehicle front-rear direction and the vehicle width direction, and that abuts and is joined to the first lower wall.

In the vehicle body structure of the fourth aspect, the rear floor side member front portion is configured including the third upright wall, the third upper wall, and the third lower wall. The third upright wall is provided extending along the vehicle vertical direction and the vehicle front-rear direction at the vehicle vertical direction center portion of the rear floor side member front portion, and abuts and is joined to the second upright wall of the rear floor side member rear portion. The third upper wall is provided extending along the vehicle front-rear direction and the vehicle width direction at the vehicle vertical direction upper side of the third upright wall, is linked to the third upright wall, and abuts and is joined to the first upper wall of the rocker rear inner. The third lower wall is provided extending along the vehicle front-rear direction and the vehicle width direction at the vehicle vertical direction lower side of the third upright wall at a position capable of opposing the third upper wall, is linked to the third upright wall, and abuts and is joined to the first lower wall of the rocker rear inner.

In the present disclosure, the rear floor side member front portion is joined to the rocker rear inner. As described above, in the third aspect, the rear floor side member rear portion is joined to the rear floor side member front portion in a state in which the gaps are provided between the rear floor side member rear portion and the rocker rear inner.

Thus, in the present disclosure, collision load input to the rocker rear inner in a vehicle side-on collision is first transmitted toward the rear floor side member front portion. Since the rear floor side member front portion is made of a ferrous metal, the rear floor side member front portion undergoes plastic deformation when input with impact load, enabling impact energy to be absorbed.

A fifth aspect of the vehicle body structure of the fourth aspect of the vehicle body structure that further includes: a bead portion that is formed at the rear floor side member front portion along the vehicle front-rear direction, and that projects so as to have a recessed shape or a protruding shape in the vehicle width direction; and a spot join between the rear floor side member front portion and the rear floor side member rear portion that is provided at an extension line of the bead portion.

In the vehicle body structure of the fifth aspect, the bead portion that projects so as to have a recess shape or a protruding shape in the vehicle width direction is formed to the rear floor side member front portion so as to run along the vehicle front-rear direction. The spot join between the rear floor side member front portion and the rear floor side member rear portion is provided on an extension line of the bead portion.

Forming the bead portion to the rear floor side member front portion enables the rigidity of the rear floor side member front portion to be increased. Moreover the spot join between the rear floor side member front portion and the rear floor side member rear portion has a higher rigidity than other locations. Namely, this enables deformation of the rear floor side member front portion to be suppressed. Moreover, a ridge line is formed by forming the bead portion to the rear floor side member front portion, thereby enabling collision load to be effectively transmitted from the rear floor side member front portion to the rocker rear inner in a rear collision of the vehicle.

The first aspect enables failure of the rear floor side member to be suppressed, even in a vehicle side-on collision such as a side-on collision with a pole.

The second aspect enables heterogeneous members to be joined using rivets.

The third aspect enables deformation on the rear floor side member rear portion side to be suppressed.

The fourth aspect enables impact energy to be absorbed by plastic deformation of the rear floor side member front portion when input with impact load.

The fifth aspect enables deformation of the rear floor side member front portion to be suppressed, and enables collision load to be effectively transmitted from the rear floor side member front portion to the rocker rear inner in a rear collision of the vehicle.

What is claimed is:

1. A vehicle body structure that includes a rear floor side member that extends along a vehicle front-rear direction at a vehicle width direction end portion of a vehicle rear section and that is divided into front and rear portions in the vehicle front-rear direction, the rear floor side member comprising:
    a rear floor side member front portion that is made of a ferrous metal and that configures a front portion of the rear floor side member;
    a rear floor side member rear portion that is die-cast and that configures a rear portion of the rear floor side member, the rear floor side member front portion abuts and is joined together with an outer side of the rear floor side member rear portion; and
    a joint section that is provided between a vehicle width direction inner side of a rocker rear, which is provided along the vehicle front-rear direction at the vehicle front-rear direction rear side of a rocker extending along the vehicle front-rear direction at a vehicle side section, and a vehicle front-rear direction front end of an attachment portion of a rear suspension member in vehicle side view, and that joins together the rear floor side member front portion and the rear floor side member rear portion.

2. The vehicle body structure of claim 1, wherein:
    a cross-section profile of a rocker rear inner configuring a vehicle width direction inner side of the rocker rear, when sectioned along a vehicle vertical direction and the vehicle width direction, is an open cross-section profile that opens toward a vehicle width direction outer side;
    the rocker rear inner includes:
        a first upright wall that is provided at a vehicle vertical direction center portion of the rocker rear inner and that extends along the vehicle vertical direction and the vehicle front-rear direction,
        a first upper wall that is provided at a vehicle vertical direction upper side of the first upright wall, and that is linked to the first upright wall by extending along the vehicle front-rear direction and the vehicle width direction, and
        a first lower wall that is provided at a vehicle vertical direction lower side of the first upright wall so as to oppose the first upper wall, and that is linked to the first upright wall by extending along the vehicle front-rear direction and the vehicle width direction; and
    the rear floor side member rear portion includes:
        a second upright wall that is provided at a vehicle vertical direction center portion of the rear floor side member rear portion so as to oppose the first upright wall and that extends along the vehicle vertical direction and the vehicle front-rear direction,
        a second upper wall that is provided at a vehicle vertical direction upper side of the second upright wall, that is linked to the second upright wall by extending along the vehicle front-rear direction and the vehicle width direction, that is disposed in a state in which a gap is provided between the second upper wall and the first upright wall, and that is provided at a position that overlaps with the first upright wall in vehicle side view, and
        a second lower wall that is provided at a vehicle vertical direction lower side of the second upright wall so as to oppose the second upper wall, that is linked to the second upright wall by extending along the vehicle front-rear direction and the vehicle width direction, that is disposed in a state in which a gap is provided between the second lower wall and the first upright wall, and that is provided at a position that overlaps with the first upright wall in vehicle side view.

3. The vehicle body structure of claim 2, wherein the rear floor side member front portion further includes:
    a third upright wall that is provided at a vehicle vertical direction center portion of the rear floor side member front portion, that extends along the vehicle vertical direction and the vehicle front-rear direction, and that abuts and is joined to the second upright wall;
    a third upper wall that is provided at a vehicle vertical direction upper side of the third upright wall, that is linked to the third upright wall by extending along the vehicle front-rear direction and the vehicle width direction, and that abuts and is joined to the first upper wall; and
    a third lower wall that is provided at a vehicle vertical direction lower side of the third upright wall so as to be able to oppose the third upper wall, that is linked to the third upright wall by extending along the vehicle front-rear direction and the vehicle width direction, and that abuts and is joined to the first lower wall.

4. The vehicle body structure of claim 2, wherein the rear floor side member front portion further includes:
    a third upright wall that is provided at a vehicle vertical direction center portion of the rear floor side member front portion, that extends along the vehicle vertical direction and the vehicle front-rear direction and that is joined to the second upright wall, such that a closed cross-section area is formed between the third upright wall and the second upright wall;
    a third upper wall that is provided at a vehicle vertical direction upper side of the third upright wall, that is linked to the third upright wall by extending along the vehicle front-rear direction and the vehicle width direction, and that abuts and is joined to the first upper wall; and
    a third lower wall that is provided at a vehicle vertical direction lower side of the third upright wall so as to be able to oppose the third upper wall, that is linked to the third upright wall by extending along the vehicle front-rear direction and the vehicle width direction, and that abuts and is joined to the first lower wall.

5. The vehicle body structure of claim 3, further comprising:
    a bead portion that is formed at the rear floor side member front portion along the vehicle front-rear direction, and that projects so as to have a recessed shape or a protruding shape in the vehicle width direction; and a spot join between the rear floor side member front portion and the rear floor side member rear portion that is provided at an extension line of the bead portion.

\* \* \* \* \*